(12) United States Patent
Friedman et al.

(10) Patent No.: US 9,569,542 B2
(45) Date of Patent: Feb. 14, 2017

(54) METHOD AND SYSTEM FOR CROSS-PLATFORM REAL TIME DECISION MAKING

(75) Inventors: Gil Friedman, Bney-Atarot (IL); Amir Naor, Ashkelon (IL)

(73) Assignee: SAP SE, Walldorf (DE)

( * ) Notice: Subject to any disclaimer, the term of this patent is extended or adjusted under 35 U.S.C. 154(b) by 1040 days.

(21) Appl. No.: 12/976,135

(22) Filed: Dec. 22, 2010

(65) Prior Publication Data

US 2012/0166386 A1 Jun. 28, 2012

(51) Int. Cl.
*G06F 17/30* (2006.01)
*G06Q 30/02* (2012.01)

(52) U.S. Cl.
CPC ......... *G06F 17/30867* (2013.01); *G06Q 30/02* (2013.01)

(58) Field of Classification Search
CPC .... G06F 17/301; G06F 17/308; G06F 17/309; G06F 17/30867; G06F 17/30864; G06Q 30/02; G06Q 30/0261
USPC ................... 707/706, 707, 708, 724
See application file for complete search history.

(56) References Cited

U.S. PATENT DOCUMENTS

| | | | |
|---|---|---|---|
| 2005/0033631 A1* | 2/2005 | Wefers ............ | G06Q 10/06393 705/7.29 |
| 2005/0267975 A1* | 12/2005 | Qureshi et al. ............... | 709/229 |
| 2007/0015518 A1* | 1/2007 | Winter et al. .............. | 455/456.1 |
| 2008/0294678 A1* | 11/2008 | Gorman et al. .............. | 707/102 |
| 2009/0293011 A1* | 11/2009 | Nassar ......................... | 715/781 |
| 2010/0138425 A1* | 6/2010 | Lin et al. ..................... | 707/741 |
| 2011/0004830 A1* | 1/2011 | Von Kaenel et al. ......... | 715/751 |
| 2011/0055329 A1* | 3/2011 | Abt et al. ..................... | 709/205 |

* cited by examiner

*Primary Examiner* — Scott A Waldron
*Assistant Examiner* — Fatima Mina
(74) *Attorney, Agent, or Firm* — Buckley, Maschoff & Talwalker LLC

(57) ABSTRACT

According to some embodiments, a system includes a business data provider, collaboration platform, a user client device, and a web application server interfacing with the business data provider, the user client device, and the collaboration platform. In some embodiments, the user client device communicates with the web application using a markup language to request and receive business data and collaboration data from the business data provider and the collaboration platform, respectively.

15 Claims, 7 Drawing Sheets

METHOD AND SYSTEM FOR CROSS-PLATFORM REAL TIME DECISION MAKING

FIELD

Some embodiments relate to a web application. More specifically, some embodiments provide a system and method for a web application to provide contextual business data across a plurality of platforms.

BACKGROUND

A number of presently developed and developing computer systems are directed with providing a user access to large amounts of data. However, many such systems are directed to individuals working in an office environment having the luxury of time to search for an answer as assisted in their search by a powerful computing device. In contrast, many people find themselves increasingly in need of information wherever they may be. Many people may have a need for business related data notwithstanding whether they are in an office or not since business opportunities may happen suddenly and unexpectedly.

Likewise, there is an ever-growing amount of "unstructured" communication and related information. Such unstructured information may encompass emails, text messages, social networks, instant messages, informal "team" discussion groups, and other types of communications. While the data may be referred to as unstructured, the knowledge and information conveyed in some unstructured data is helpful, both socially as well as in business contexts since business communication does not happen in formal channels alone.

Accordingly, a method and mechanism for efficiently requesting and responding to requests for structured and unstructured data, in a relevant context and for a wide variety of platforms are provided by some embodiments herein.

DETAILED DESCRIPTION

In an effort to more fully and efficiently use the resources of a user, a system and methods are provided to facilitate the retrieval and sharing of contextual business data, as well as the collaborative exchange of information.

Figure 1:
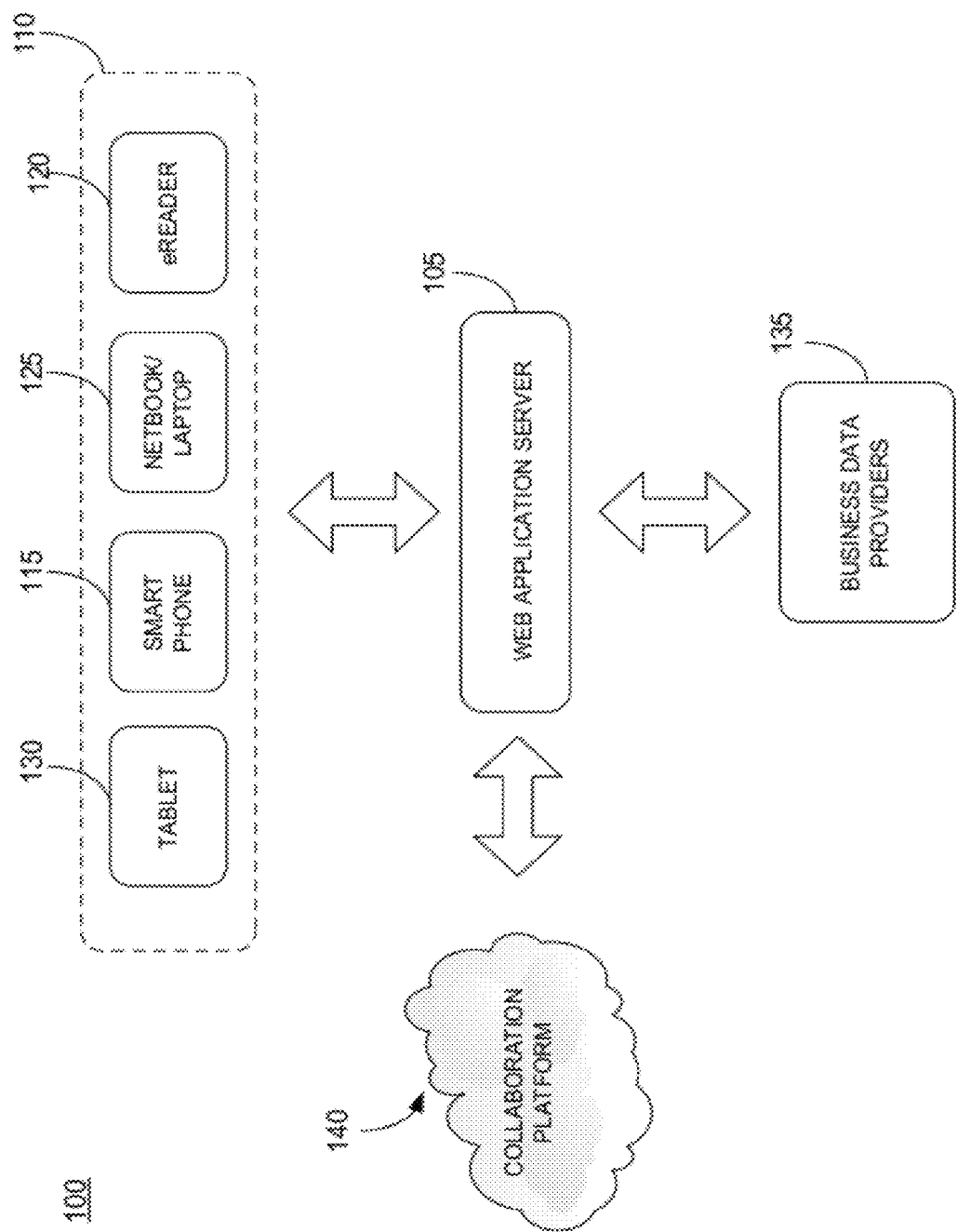
FIG. 1 is a block diagram of an operating environment according to some embodiments.

FIG. 1 is a block diagram of a system 100 or operating environment, in accordance with some embodiments herein. System 100 includes a web application server (WAS) 105 that may communicate with user client devices 110, business data providers 135, and collaboration platform 140 in order to send and receive requests for business data and collaboration related information, and the response in reply to such requests. In some aspects, web application server 105 may invoke a variety of scripts and services to query business data providers 135 and collaboration platform 140. Furthermore, some aspects of WAS 105 may operate to receive requests for information from user client devices 110 and in reply deliver information to user client devices 110.

In some embodiments, communication between WAS 105 and user client devices 110 may be based on the use of a markup language. In some embodiments, HTML 5 (Hyper-Text Markup Language), may be used to communicate with a wide variety of the user client devices. Communication between user client devices 110 and WAS 105 may be possible with any of the user client devices 110, such as, for example, smart phone 115, eReader 120, netbook/laptop 125, tablet 130, and other devices supportive of HTML 5, including devices having web browsers that support HTML 5. Additionally, the use of HTML 5 as the communication protocol also means user client devices 110 need only run a browser compatible with HTML 5 in order to communicate with WAS 105.

Business data providers 135 may comprise, for example, an enterprise service platform, a database management system, and a private company that specifically houses and manages business data. In some embodiments, business data providers 135 may include web based sources of information such as, for example, web-based search engines. In some instances, business data provided by business data providers 135 may relate to a particular industry or industry segment. In some instances, business data providers 135 may include data sources such as social networking sites. An example of business data may include customer relationship management (CRM) data and business reports. In some embodiments, business data provided by business data providers 135 may include business analytics data.

Collaboration platform 140 may provide an integrated framework of software components including messaging (e.g., email, instant messaging, text, etc.), shared calendaring and scheduling, sharing of contacts, synchronizing of "team" notes and files. In some embodiments, many users may simultaneously gather and collaborate in the space of the collaboration platform 140.

The data accessible through WAS 105 may include both structured data and unstructured data, and may vary from formal, hierarchical analytical reports from business data providers 135 to records of team members' informal comments regarding customers from collaboration platform 140.

Figure 2:
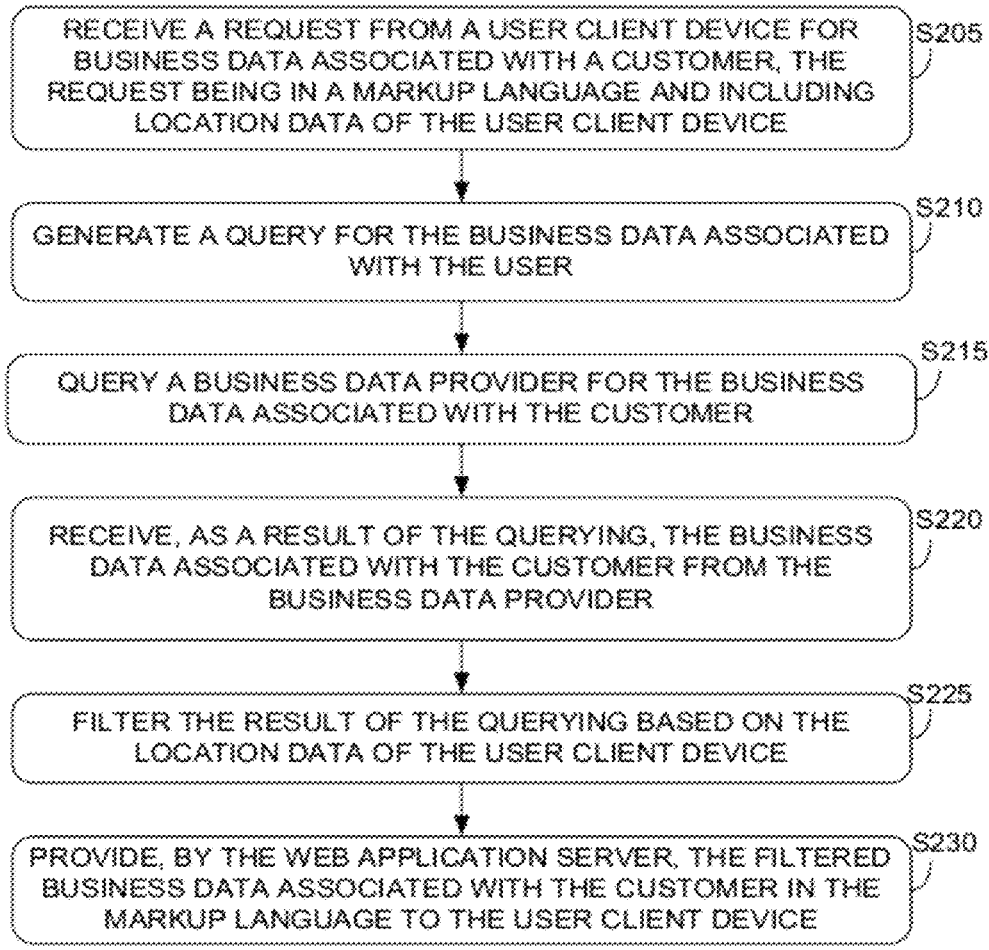
FIG. 2 is a flow diagram relating to some embodiments herein.

FIG. 2 relates to a flow diagram of a process 200, in accordance with some embodiments herein. In some aspects, process 200 relates to a method of business data retrieval. At S205, a request from a user client device is received. The request is for certain business data associated with a particular customer. For example, a sales manager attending a conference may realize that he has an open afternoon schedule due to the cancellation of a conference meeting. The sales manager may then use an HTML 5 supportive browser on his smart phone to contact WAS 105 to initiate a business data retrieval session. In reply to this initial contact by the sales manager's (i.e., the user's) user client device, WAS 105 provides the smart phone (e.g., 115) with appropriate code to run. The code may include HTML and Java Script. The code is then executed and the location of the user client device is automatically retrieved. The device location may be retrieved using HTML 5 Application Programming Interfaces (APIs). Referring to S205 of the flow, the request for information, including the user client device, is sent to WAS 105.

At S210, a query for the data associated with the customer is generated. Moreover, the query is executed at S215. WAS 105 queries the business data provider 135 for information related to the customer.

At S220, the business data associated with the customer is received from a business data provider 135. While business data relating to the customer has been retrieved, the business data remains to be filtered according to the location of the user client device 115. At S225, a location filter is applied to the result of the querying. The location filter corresponds to the location of the user client device.

At S230, WAS 105 may provide the filtered business data associated with the customer to the user client device. In some embodiments, the filtered business data is provided to user client device 115 in HTML 5. Since the user client device supports HTML 5, the filtered business data associated with the customer may be efficiently rendered on the user's smart phone.

On the client side, the location of the customer and the current location of the user client device may be rendered in an interactive map on the user's smart phone or other applicable or compatible device. Being an interactive map, the user may be able to zoom in and zoom out on the map, to provide the user with a different perspective of the data presented therein.

Figure 3:
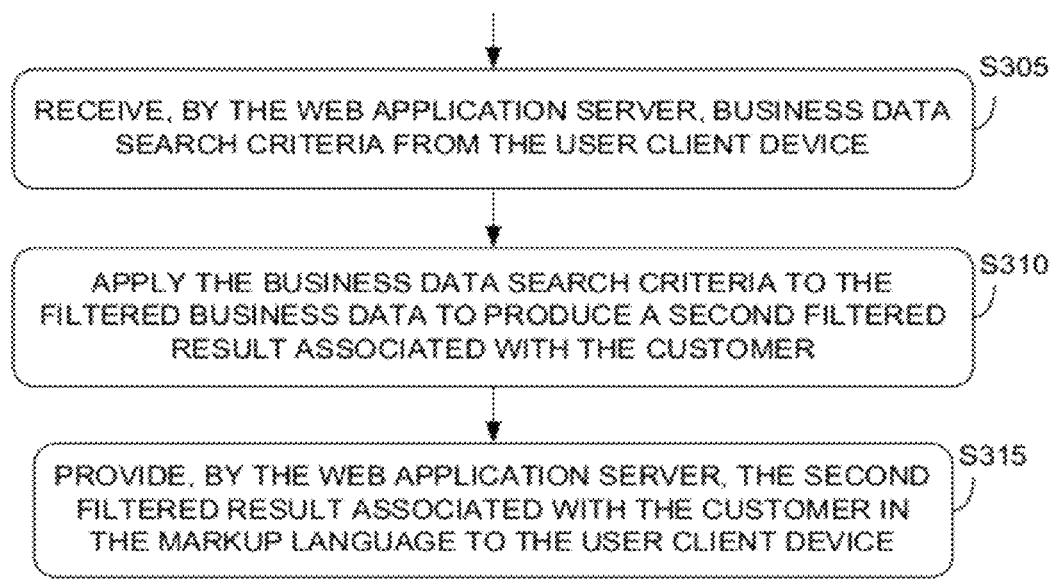
FIG. 3 is a flow diagram relating to some embodiments herein.

In some embodiments, further filters may be applied to the retrieved customer business data. In some instances, business filters may be applied to the retrieved business data to further refine the data for use by the user (e.g., sales manager). FIG. 3 is a flow diagram of a process 300 to further refine the business data retrieved from the business data providers. At S305, WAS 105 receives business data search criteria from the user client device 115. The filter or search criteria may include, for example, a distance the customer is to/from the user, an industry the customer is in; amount of revenue for the company, a number or type of open calls; a number or type of open opportunities, and possibly other criteria.

In some embodiments, filtering on business data may be accomplished by WAS 105, while is some other embodiments the filtering on the business data may be performed by querying business data provider 135 for the filtered results. In some embodiments, filtering on the business data may be performed by a combination of WAS 105 and business data providers 135.

Figure 4:
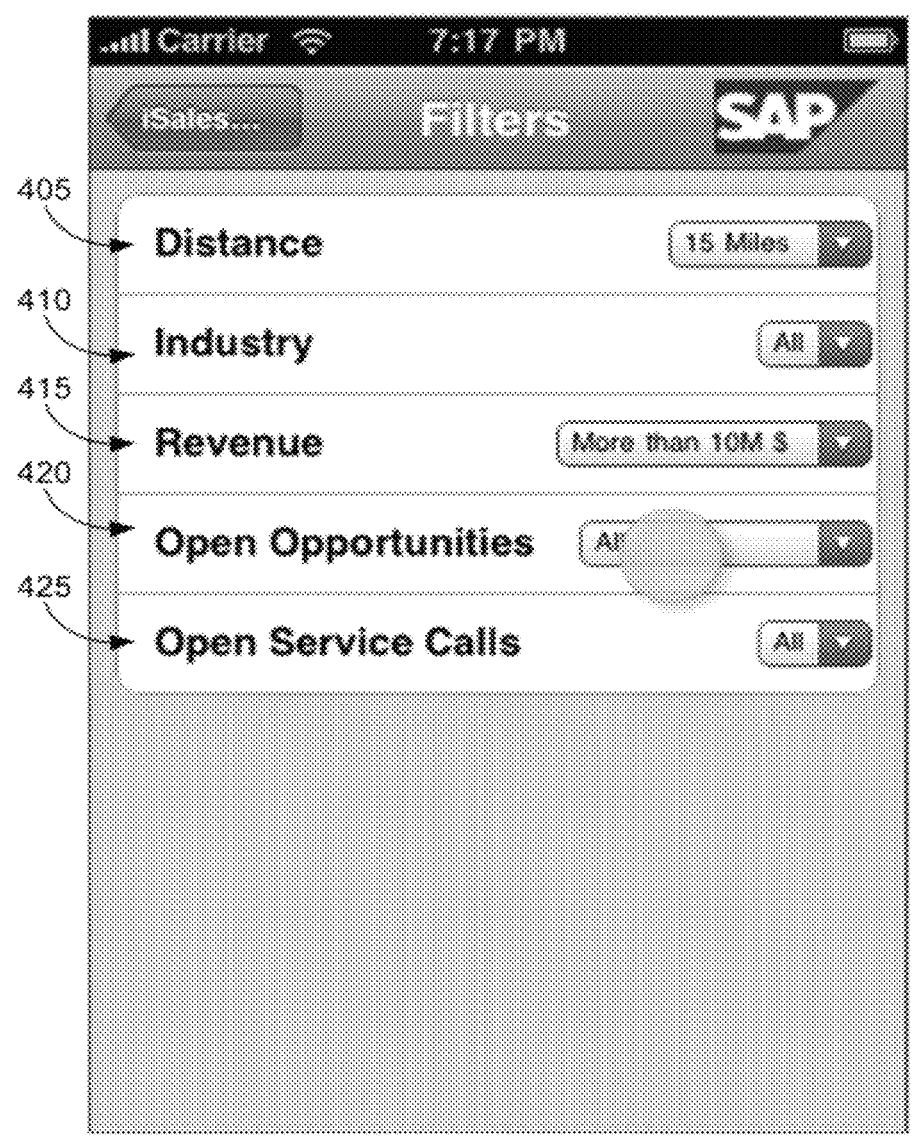
FIG. 4 is an illustrative screen of a user client device according to some embodiments.

FIG. 4 is an illustrative screenshot 400 of a user interface screen a user may access to select one or more filter criteria from a user interface of a smart phone, tablet, etc. The filter selections depicted in FIG. 4 are illustrative examples of some types of filters that may be used herein. As shown, there is a distance filter 405 option, an industry 410 option, a revenue 415 option for selecting an entity based on the amount of revenue the entity generates; an open opportunities option 420, and an open service calls option 425.

Returning to the process 300 of FIG. 3, the business search criteria is applied to the previously retrieved business data to produce a second or further filtered data result at S310. At S315, WAS 105 provides the second filtered data result to the user client device. The WAS passes the second filtered result to the user client device in the markup language (e.g., HTML 5).

Figure 5:
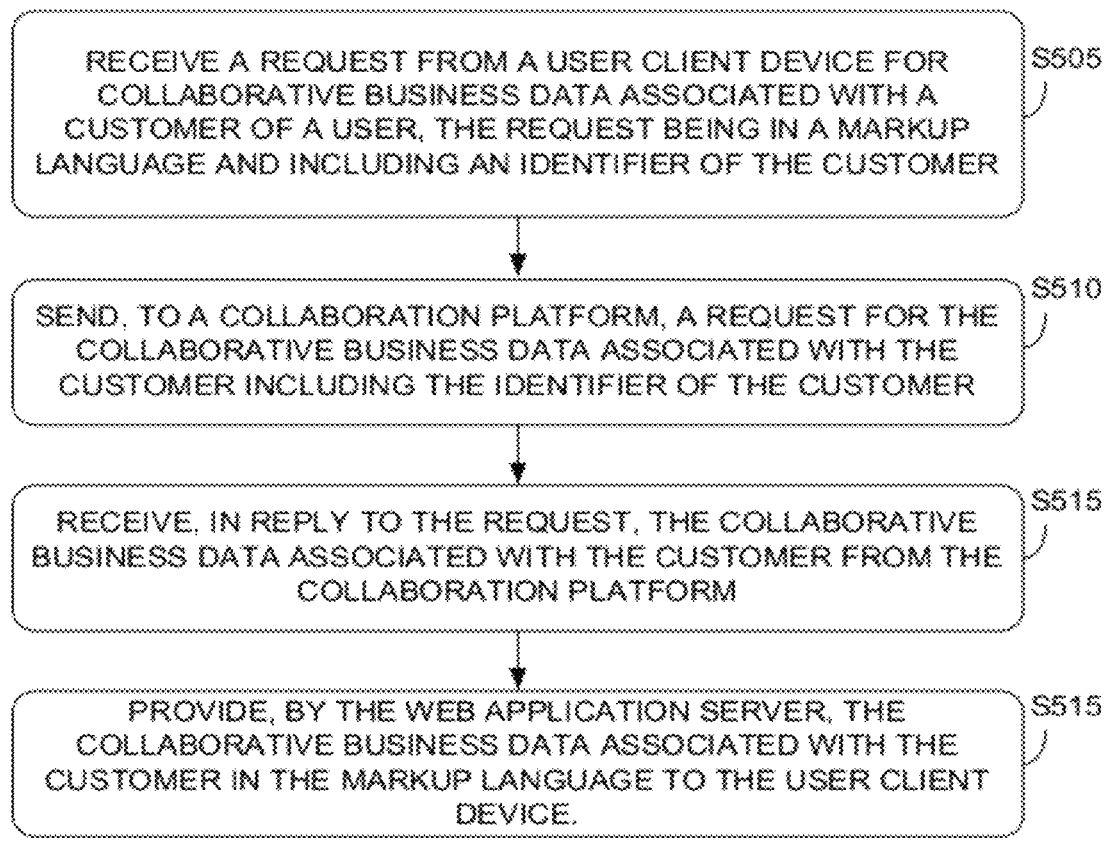
FIG. 5 is a flow diagram relating to some embodiments herein.

In some embodiments, system 100 may provide a mechanism by which a user may interact with a collaboration platform. Referring to FIG. 5, S505, the web application server receives a request from a user client device for collaborative business data associated with a customer of a user. In accordance with some aspects herein, the request for the collaborative business data is provided in a markup language. In this manner, the communication between the WAS and the user client device is independent of the particular user client device. It is noted that the request may include an identifier of the customer or subject of a collaboration activity. In some embodiments, communication between user client device 110 may be handled directly by the user client device based on logic from WAS 105.

At S510, a request for the collaborative business data associated with the customer or other entity, including the identifier of the customer, is sent to a collaboration platform. Continuing to S515, the collaborative business data associated with the customer is received from collaboration platform 140 in reply to the request.

At S520, the collaborative business data associated with the customer is provided, by the web application server, in the markup language to the user client device.

Figure 6:
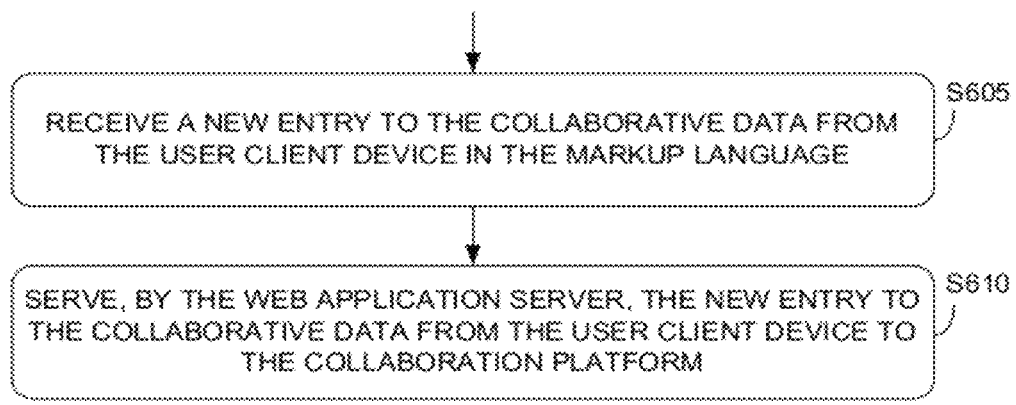
FIG. 6 is a flow diagram relating to some embodiments herein.

FIG. 6 relates to a process for a user to interact with a collaboration platform by contributing content. As used herein, the content may be one or more of a text file, audio, video, and combinations thereof. Additionally, the content may be the result of a messaging session, including real-time social network message sessions. For example, at S605 of process 600 shown in FIG. 6, a new entry to the collaborative data is received from the user client device. The entry may be provided in the markup language, thereby realizing some of the benefits that may be had by using a standardized markup language.

At S610, the new entry to the collaborative data from the user client device is served or sent to collaboration platform 140 by the web application server 105.

As demonstrated by the methods and examples herein, WAS 105 handles requests from user or consumers as represented by the user client devices 110. In handling the requests, WAS responds with appropriate Java Script and HTML generated to the multiple types of user client devices 110. The methods and processes herein also serve to highlight the ability of WAS 105 to expose both "structured" and "unstructured" to the user client whether originating from a business provider or a collaboration platform, respectively.

Figure 7:
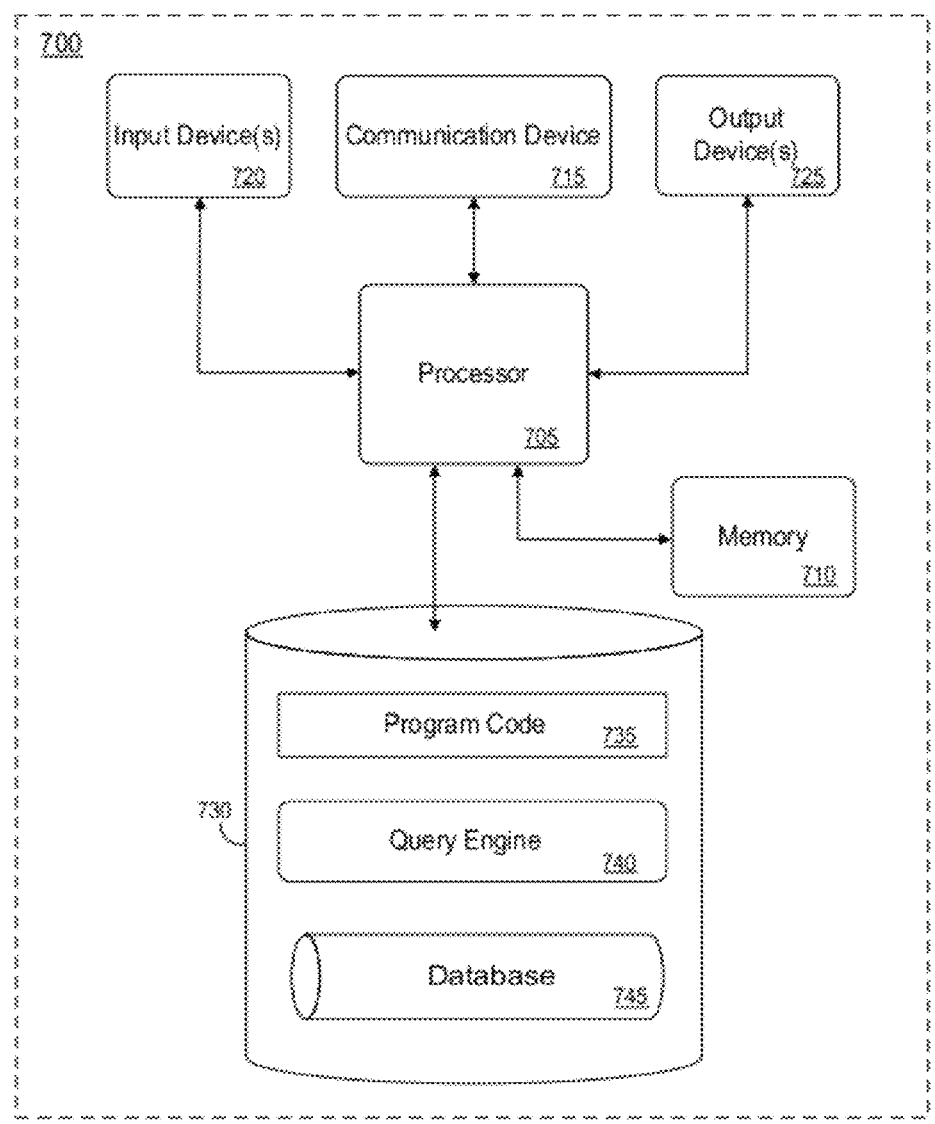
FIG. 7 is a block diagram of a system according to some embodiments.

FIG. 7 is a block diagram overview of a search platform 700 according to some embodiments. The search platform 700 may be, for example, associated with any of the devices described herein, including WAS 105. The search platform 700 comprises a processor 705, such as one or more commercially available Central Processing Units (CPUs) in the form of one-chip microprocessors or a multi-core processor, coupled to a communication device 715 configured to communicate via a communication network (not shown in FIG. 7) to a front end client (not shown in FIG. 7). Device 700 may also include a local memory 710, such as RAM memory modules. Communication device 715 may be used to communicate, for example, with one or more client devices or business service providers. The search platform engine 700 further includes an input device 720 (e.g., a mouse and/or keyboard to enter content) and an output device 725 (e.g., a computer monitor to display a user interface element).

Processor 705 communicates with a storage device 730. Storage device 730 may comprise any appropriate information storage device, including combinations of magnetic storage devices (e.g., a hard disk drive), optical storage devices, and/or semiconductor memory devices.

Storage device 730 stores a program 735 for controlling the processor 705 and query engine application 745 for determining, constructing, and executing queries. Processor 705 performs instructions of the programs 735 and 745 and thereby operates in accordance with any of the embodiments described herein. Programs 735 and 745 may be stored in a compressed, uncompiled and/or encrypted format. Programs 735 and 745 may furthermore include other program elements, such as an operating system, a database management system, and/or device drivers used by the processor 705 to interface with peripheral devices.

In some embodiments (such as shown in FIG. 7), the storage device 730 stores a database 750 to facilitate the determination and construction of queries. The query database may include data structures, rules, and conditions for determining a query based on user interface selections as described herein.

Each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

The systems and methods herein have been described, in some instances, in the context of an interactive communication between a user and a customer. It should be appreciated that the systems and methods herein may be utilized by these and other entities, whether alone or in combination. For example, some entities may include a customer, a service call, a business organization, etc.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
   receiving, by a web application server, a request from a user client device for business data associated with an existing customer of a user, the request being in a markup language and includes an identifier of the existing customer and location data of the user client device;
   sending, to a business data provider, a request for the business data associated with the existing customer;
   receiving, in reply to the request, business data associated with the existing customer from the business data provider;
   filtering the business data based on the location data of the user client device;
   providing, by the web application server, the filtered business data associated with the existing customer in the markup language to the user client device, the filtered business data including an indication of a location of the existing customer relative to the user client device;
   rendering the indication of the location of the existing customer and a current location of the user client device in an interactive map on the user client device;
   receiving, by a web application server, a request from the user client device for collaborative business data associated with an existing customer of the user, the request being in a markup language and includes an identifier of a particular existing customer selected from the filtered business data;
   sending, to a collaboration platform, a request for the collaborative business data associated with the particular existing customer, including the identifier of the particular existing customer, the collaborative business data including a combination of messaging data, shared contact data, shared calendaring data, and shared team collaboration data;
   receiving, in reply to the request, the collaborative business data associated with the particular existing customer from the collaboration platform; and
   providing, by the web application server, the collaborative business data associated with the particular existing customer in the markup language to the user client device.

2. The method of claim 1, wherein the web application server performs the filtering.

3. The method of claim 1, wherein the filtered business data associated with the customer provided to the user client device in the markup language is rendered as an interactive map on the user client device.

4. The method of claim 3, wherein the filtered business data associated with the customer includes contact information for the customer and the interactive map includes an indication of a location for the customer in relation to the user client device.

5. The method of claim 1, further comprising:
   receiving, by the web application server, business data search criteria from the user client device;
   applying the business search criteria to the filtered business data associated with the customer to produce a second filtered result associated with the customer; and
   providing, by the web application server, the second filtered result associated with the customer in the markup language to the user client device.

6. The method of claim 1, wherein the web application server further provides a mapping service relating the identifier of the customer to the collaborative business data.

7. The method of claim 1, wherein the markup language is HyperText Markup Language.

8. The method of claim 1, further comprising:
   receiving a new entry to the collaborative data from the user client device in the markup language; and
   serving, by the web application server, the new entry to the collaborative data from the user client device to the collaboration platform.

9. A system, comprising:

a web application server interfacing with a collaboration platform and a user client device, the web application server including a processor in communication with a memory storage unit containing executable program instructions that cause the processor to control the web application server to:

receive a request from a user client device for business data associated with an existing customer of a user, the request being in a markup language and includes an identifier of the existing customer and location data of the user client device;

send a request for the business data associated with the existing customer;

receive, in reply to the request, business data associated with the existing customer from the business data provider;

filter the business data based on the location data of the user client device;

provide the filtered business data associated with the existing customer in the markup language to the user client device, the filtered business data including an indication of a location of the existing customer relative to the user client device;

render the indication of the location of the existing customer and a current location of the user client device in an interactive map on the user client device;

receive a request from the user client device for collaborative business data associated with an existing customer of the user, the request being in a markup language and includes an identifier of a particular existing customer selected from the filtered business data;

send, to the collaboration platform, a request for the collaborative business data associated with the particular existing customer, including the identifier of the particular existing customer, the collaborative business data including a combination of messaging data, shared contact data, shared calendaring data, and shared team collaboration data;

receive, in reply to the request, the collaborative business data associated with the particular existing customer from the collaboration platform; and provide the collaborative business data associated with the particular existing customer in the markup language to the user client device.

10. The system of claim 9, wherein the filtered business data associated with the customer provided to the user client device in the markup language is rendered as an interactive map on the user client device.

11. The system of claim 10, wherein the filtered business data associated with the customer includes contact information for the customer and the interactive map includes an indication of a location for the customer in relation to the user client device.

12. The system of claim 9, wherein the web application server further operates to:

receive business data search criteria from the user client device;

apply the business data search criteria to the filtered business data associated with the customer to produce a second filtered result; and provide the second filtered result associated with the customer in the markup language to the user client device.

13. The system of claim 9, wherein the web application server is further operative to:

provide a mapping service relating the identifier of the customer to the collaborative business data.

14. The system of claim 9, wherein the markup language is HyperText Markup Language.

15. The system of claim 9, wherein the web application server is further operative to:

receive a new entry to the collaborative data from the user client device in the markup language; and serving, by the web application server, the new entry to the collaborative data from the user client device to the collaboration platform.

* * * * *